United States Patent [19]

Golan

[11] Patent Number: 5,790,047
[45] Date of Patent: Aug. 4, 1998

[54] SYSTEM AND METHOD FOR MARKING A COW WITH A VISIBLE TREATMENT CODE

[75] Inventor: Udi Golan, Bikat Beit Hakerem, Israel

[73] Assignee: S.A.E. Afikim, Kibbutz Afikim, Israel

[21] Appl. No.: 592,574

[22] Filed: Jan. 26, 1996

[51] Int. Cl.$^6$ ............................. H04Q 9/00; G08B 13/14
[52] U.S. Cl. .................. 340/825.54; 340/825.34; 340/572; 40/300
[58] Field of Search .................. 340/825.54, 825.5, 340/572, 551, 825.34, 825.49; 40/300

[56] References Cited

U.S. PATENT DOCUMENTS

| | | |
|---|---|---|
| 4,352,253 | 10/1982 | Oswalt . |
| 4,463,706 | 8/1984 | Meister et al. . |
| 4,510,495 | 4/1985 | Sigrimis et al. . |
| 4,541,402 | 9/1985 | Winters . |
| 4,827,395 | 5/1989 | Anders et al. ............ 340/825.54 |
| 5,309,864 | 5/1994 | Harmsen et al. . |
| 5,322,034 | 6/1994 | Willham et al. . |

*Primary Examiner*—Michael Horabik
*Assistant Examiner*—Edward Merz
*Attorney, Agent, or Firm*—Browdy and Neimark

[57] ABSTRACT

A system for marking a cow with a visible marking indicative of a treatment to be carried out on the cow, comprising an identification tag located on the cow and bearing a unique identity code for remotely identifying the cow, and a database containing for each cow in a herd a corresponding identity code and a treatment code relating to a treatment to be carried out on the cow. The cow passes through a paint spray station en route between a milking parlor and corral and is interrogated for determining in respect of each cow its corresponding unique identity code, and the database is accessed so as to extract therefrom the corresponding treatment code. The paint spray station is coupled to the database access means and includes a plurality of different colored spray guns which are responsive to the treatment code for marking on the cow a visible marking uniquely identifying the treatment code.

8 Claims, 2 Drawing Sheets

SYSTEM AND METHOD FOR MARKING A COW WITH A VISIBLE TREATMENT CODE

CROSS-REFERENCE TO RELATED APPLICATION

Not applicable

RESEARCH SPONSORSHIP

Not applicable

MICROFICHE APPENDIX

Not applicable

FIELD OF THE INVENTION

This invention relates to the color coding of dairy cows for the purpose of carrying out specific treatments.

BACKGROUND OF THE INVENTION

One of the problems associated with dairy herd management is the need to locate, at a distance, different cows requiring different treatments, such as insemination, medical treatment and so on. An injection, for example, may be given manually but, in order to do so, it is first necessary to locate which cow or cows require injecting.

Frequently, such treatment is carried out following a milking session whilst a group of cows is returning from the milking parlor to the group's yard (corral). Those individual cows requiring treatment are isolated from the rest of the group and sent to a special treatment yard where the treatment is carried out and the cows must then be returned to their own yard.

In large dairy farms wherein there are many different herds of cows each having its own yard, this represents a not insignificant management problem. Specifically, care must be taken to identify which cows in a group require treatment; to despatch those cows to the treatment center; and then to return the cows to their appropriate group yard bearing in mind that, at the treatment center, they will likely intermingle with cows from other group yards which have also arrived for treatment. This requirement imposes a heavy burden on the farmers and it would therefore be desirable to devise a system and method for effecting treatment on cows which would allow a farmer or a veterinarian to perform the treatment in situ whilst the cow remains in its own yard thus obviating the need for the cow to be separated from her group for the purpose of effecting the required treatment at a centralized location. However, each corral may itself contains several hundred cows thus making it difficult to isolate only those cows which require treatment even if the treatment is then performed in situ.

The need to identify each cow in a herd with a unique identity code for the purpose of monitoring the cow's performance is well known. For example, U.S. Pat. No. 5,322,034 (Willham et al) discloses an electronic livestock record system for storing an individual animal's identification together with performance data on a programmable electronic identification and data storage module carried with the animal. This permits remote interrogation of the animal, thus allowing remote determination of the animal's identification and performance statistics.

U.S. Pat. No. 4,463,706 (Meister et al.) discloses a system for monitoring the dispensing of drugs or nutrients to animals. The system disclosed by Meister et al. comprises one or more stationary dispensers associated with drinking fountains for farm animals, for dispensing predetermined doses of drugs or nutrients, operating in cooperation with a plurality of portable units constructed for individual animals. The portable unit includes a coded transponder carried or worn by the animal so as to be automatically interrogated by the stationary dispenser when the animal comes within close proximity thereto. Upon such interrogation, the portable transponder sends a coded signal to the dispenser indicating whether a dose has been received within a preceding pre-selected time interval. If no such dose were dispensed, then a dispenser valve is enabled, releasing the desired pre-measured dose into the animal's feeding trough.

Thus, the system disclosed by Meister et al. allows for the dispensation of a drug into an animal's feeding trough during the period of time that the animal is feeding. Such a system exploits the fact that the animal is feeding to introduce into the feeding trough the required dose of medication etc. Furthermore, such an approach exploits the fact that, during feeding, the cow is constrained within a fixed area and, in effect, the cow takes the required dose rather than being administered it. Consequently, such an approach is not applicable to the more general situation where a cow is in its own corral and must be selected from amongst its peers in order to perform a required treatment; nor to the more general situation where the treatment is not administered orally and so cannot simply be added to the cow's feed.

U.S. Pat. No. 5,309,864 (Harmsen et al.) discloses a system for feeding livestock in a plurality of individual stalls each having a respective feed container which is filled with food by an overhead gantry. Each animal carries an identification label for generating a unique code identifying the animal in an electromagnetic interrogation field. A transmitter/receiver on the feeding station generates an electromagnetic interrogation field and receives the unique code from each animal and transmits this identification to a computer which has stored therein data relating to each unique code. The shuttle feeding station is operated by the computer to deposit additional feed into each feeding container in amounts depending upon the specific unique code for each animal.

Thus, Harmsen et al. teach the use of remote identification of livestock by the use of individual identification labels carried by each animal and utilize this information for adjusting the amount of feed which each animal receives. However, there is absent from Harmsen et al. any teaching relating to manual selection of individual animals for the purpose of administering specific treatments thereto; nor is it taught or suggested how to code the animals with a visible marking so that a farmer or veterinarian can tell at a glance which treatment to perform.

The use of color codes to identify objects is well known in general and is also disclosed in the patent literature for the specific identification of livestock in particular. For example, U.S. Pat. No. 4,352,253 (Oswalt) discloses an animal marking system for cattle and the like comprising a flexible strap which is secured around the neck of the animal and has two sets of patches: one bearing numbers and the other bearing a color code so that the numbers and colors are clearly visible from a distance from opposite sides of the animal. Oswalt further teaches the use of different identifiable colors to indicate the condition of the cow with respect to health, breeding condition or lactation.

Likewise, U.S. Pat. No. 4,541,402 (Winters) acknowledges as prior art the use of $CO_2$ cartridge type pistols for shooting a paint capsule on selected animals, permitting marking animals from a distance.

Absent from the patent literature, however, is any suggestion to combine the individual teachings of the above-mentioned references so as to allow an animal to be automatically color coded depending on its unique identity. As will be seen in the following detailed description, this combination allows for the automatic color coding of cows using a color combination which uniquely identifies a specific treatment to be carried out thereon, whereby a farmer or veterinarian can tell at a glance the required treatment to be carried out on the cow whilst the cow is in its own corral. This also obviates the need for the cow to be removed from its own corral, taken to a central location for carrying out the treatment and then sorted in order to determine in which corral the cow belongs in order that the cow can be correctly returned to its own corral.

SUMMARY OF THE INVENTION

It is a principal object of the invention to provide a system and method whereby a cow can be marked with a visible marking indicative of a treatment to be carried out on the cow, in order that the treatment can subsequently be carried out whilst the cow remains in situ in its own group yard.

To this end, there is provided in accordance with a first aspect of the invention a system for marking a cow with a visible marking indicative of a treatment to be carried out on said cow, the system comprising:

- identification means located on the cow and bearing a unique identity code for remotely identifying the cow,
- a database containing for each cow in a herd a corresponding identity code and a treatment code relating to a treatment to be carried out on the cow,
- interrogation means located en route between a milking parlor and corral for determining in respect of each cow its corresponding unique identity code,
- database access means coupled to the interrogation means and to the database and being responsive to the unique identity code for accessing the database and extracting therefrom the corresponding treatment code, and
- treatment marking means coupled to the database access means and responsive to the treatment code for marking on the cow a visible marking uniquely identifying said treatment code.

In accordance with a second aspect of the invention there is provided a method for marking a cow with a visible marking indicative of a treatment to be carried out on said cow, comprising the steps of:

(a) storing for each cow in a herd a database containing a corresponding unique identity code and a treatment code relating to a treatment to be carried out on the cow, (b) interrogating the cow as the cow passes, en route between its corral and a milking parlor so as to determine a unique identity code representative of said cow, (c) accessing the database so as to extract therefrom the treatment code corresponding to said unique identity code, and (d) marking the cow with a visible marking uniquely identifying said treatment code.

Preferably, the visible marking is a color code which uniquely indicates a corresponding treatment to be carried out on the cow. The color code is spray painted on to the cow as it returns to its corral following a milking session, thus allowing a farmer or veterinarian to perform the required treatment at the corral, whereafter the visible color marking may be erased.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
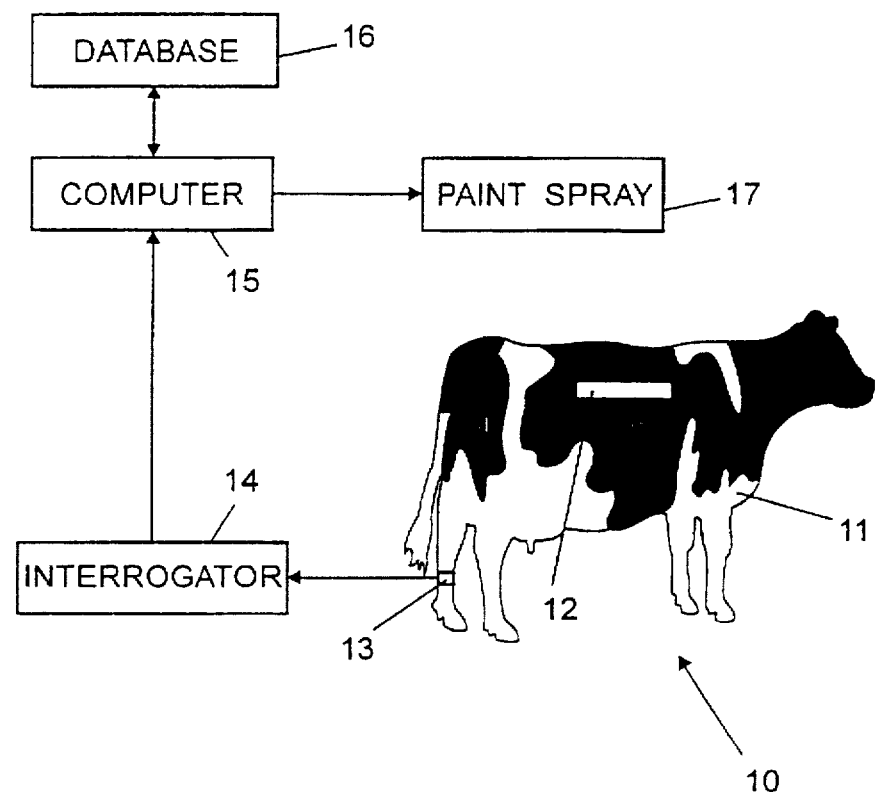
FIG. 1 is a semi-pictorial block diagram showing functionally the principal components in a system according to the invention.

FIG. 1 shows a system 10 for marking a cow 11 with a visible marking 12 indicative of a treatment to be carried out. Attached to leg of the cow 11 is an identification tag 13 (constituting an identification means) for generating a unique code in an electromagnetic interrogation field so as to provide a unique identity for the cow and which may thus be read remotely by an interrogator 14. A computer 15 is coupled to the interrogator 14 and is responsive to the unique identity of the cow 11 for accessing a database 16 in order to extract therefrom a specific treatment code or codes corresponding to the identified cow 11. The computer 15 is also coupled to a paint spray station 17 having a plurality of different colored spray guns (constituting a treatment marking means) for spraying the visible marking 12 on a flank of the cow 11 in accordance with a predetermined color scheme indicative of the specific treatment to be carried out on the cow 11.

Figure 2:
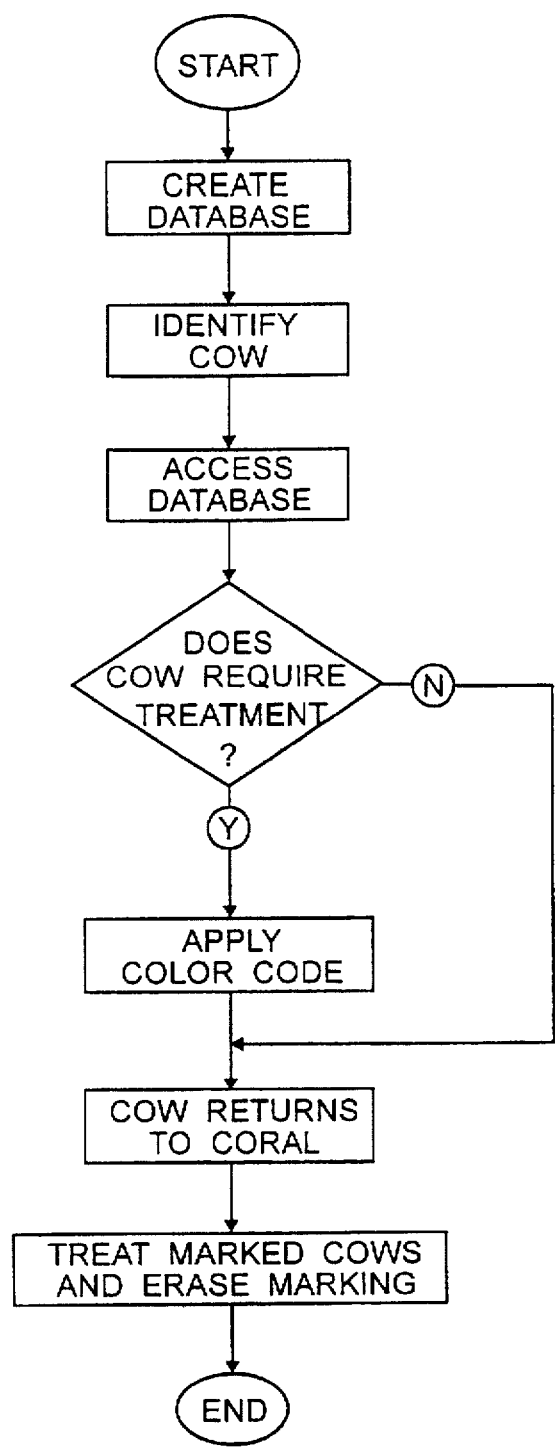
FIG. 2 is a flow diagram showing the principal steps in a method according to the invention.

In order to appreciate more clearly the specific application of the system 10 for carrying out the required treatment on the cow 11 more efficiently, reference is made to FIG. 2 of the drawings showing a flow diagram of a method for using the system 10 shown in FIG. 1.

Thus, there is created for all cows on a farm a database containing for each cow a corresponding unique identity code and a treatment code in respect of all treatments to be carried out on the cow.

Not all cows on a farm are herded together. Typically, on a large dairy farm there are several different corrals wherein a corresponding group of cows is herded. All of these cows are led to a common milking parlor along one or more fixed routes which converge on the milking parlor whereat the cows are milked and then returned along their appropriate routes to its respective corral. In accordance with the invention, the paint spray station 17 is located either on a path common to all the different routes from the various corrals to the milking parlor; or, alternatively, a separate paint spray station 17 is located on each route from the various corrals to the milking parlor. In either case, all cows from a corral pass through the paint spray station 17 en route back to their corral following a milking session. As shown in FIG. 2, upon passing through the paint spray station 17, the cow is identified and the database is accessed in order to determine whether the identified cow requires treatment. If not, then no special action is taken and the cow is simply returned to its corral in the normal manner.

However, in the event that the identified cow requires treatment, then the color code appropriate to the identified treatment is sprayed on to the cow's flank. Thereafter, the cow returns to its corral in the normal manner: this, in itself, requiring no special management since all the cows from the same corral are led to the paint spray station 17 following a milking session so that the actual marking of those cows which require it is, effectively, merely a small interruption in the return of the cows from the milking parlor to their corral via the paint station.

Thus, when all of the cows have been returned from the milking parlor to their corral, those cows requiring treatment may be instantly recognized by virtue of the color code on their flanks and, furthermore, the farmer or veterinarian will immediately know from the specific color code which treatment or treatments to carry out. These treatments may be administered in situ whilst the cow is in its own corral thus obviating any requirement to remove the cow therefrom and take it to a central treatment location from which it must be sorted and returned to its own corral. After performing the required treatment, the colored marking is washed off the cow so as to prevent repetition of the treatment until the color code is applied after a subsequent milking session.

It will be appreciated that the preferred embodiment described above is amenable to many design modifications without departing from the spirit of the invention. For this reason, many of the individual aspects of the invention have been described functionally since they are known per se and are discussed in detail in the prior art. Thus, the use of non-contact data communications employing electromagnetic interrogation fields is disclosed by Harmsen et al. as discussed in the opening section of the specification. However, as will readily be appreciated, conventional RF transmission may be employed such as described, for example, in U.S. Pat. No. 4,510,495 (Sigrimis et al.). The paint spray station has likewise been described only functionally since the application of different colored paints depending on a predetermined code is itself known and is the basis of ink jet printers and the like which are well known in the art.

The specific inventive concept of the present invention relies in the unique combination of known principles so as to allow for the automatic marking of a cow based on its unique identity so as to provide a visible marking indicative of a required treatment. Although in the method according to the preferred embodiment describes the marking is effected whilst the cow is en route from the milking parlor to the corral following a milking session, it will be appreciated that it could equally well be done whilst the cow is en route to the milking parlor.

I claim:

1. A system for marking a cow with a visible marking indicative of a treatment to be carried out on said cow, the system comprising:

identification means located on the cow and bearing a unique identity code for remotely identifying the cow, a database containing for each cow in a herd a corresponding identity code and a treatment code relating to a treatment to be carried out on the cow, interrogation means located en route between a milking parlor and corral for determining in respect of each cow its corresponding unique identity code, database access means coupled to the interrogation means and to the database and being responsive to the unique identity code for accessing the data base and extracting therefrom the corresponding treatment code, treatment marking means coupled to the database access means and responsive to the treatment code for making on the cow a visible marking uniquely identifying said treatment code, and cow routing means for routing a marked cow to a corral, cohabited by other cattle each cow bearing a unique identity code and a visible treatment marking, to await further treatment.

2. The system according to claim 1, wherein:

the visible marking is a color code, and the treatment marking means is constructed for applying at least one erasable color marking on the cow.

3. The system according to claim 2, wherein the treatment marking means includes a plurality of paint spray jets each for paint spraying a corresponding colored paint.

4. The system according to claim 1, wherein the identification means is a portable transponder worn by the cow for effecting remote communication with the interrogation means.

5. A method for marking a cow with a visible marking indicative of a treatment to be carried out on said cow, comprising the steps of:

(a) storing for each cow in a herd a database containing a corresponding unique identity code and a treatment code relating to a treatment to be carried out on the cow, (b) interrogating the cow as the cow passes, en route between a corral and a milking parlor so as to determine a unique identity code representative of said cow, (c) accessing the database so as to extract therefrom the treatment code corresponding to said unique identity code, (d) marking the cow with a visible marking uniquely identifying said treatment code, and (e) routing a marked cow to a corral, cohabited by other cattle each cow bearing its own unique identity code and a visible treatment code, to await further treatment.

6. The method according to claim 5, wherein the visible marking is a color code which is erasably sprayed on to the cow.

7. A method for treating a cow with a required treatment after the cow has returned to her herd following a milking session, said method comprising the steps of:

(a) storing for each cow in a herd a database containing a corresponding unique identity code and a treatment code relating to a treatment to be carried out on the cow, (b) interrogating the cow as the cow passes, en route between a corral and a milking parlor so as to determine a unique identity code representative of said cow, (c) accessing the database so as to extract therefrom the treatment code corresponding to said unique identity code, (d) marking the cow with a visible marking uniquely identifying said treatment code, (e) routing a marked cow to a corral cohabited by other cows each bearing its own unique identity code and a visible treatment code, (f) selecting a cow in the corral for treatment based upon its visible treatment code, (g) performing the treatment at the cow's corral, and (h) erasing the visible marking from the cow.

8. The method according to claim 7, wherein the visible marking is a color code which is erasably sprayed on to the cow.

* * * * *